May 18, 1937.  H. W. STRAAT  2,080,841

REFRACTOMETER

Filed April 26, 1935

HAROLD W. STRAAT
INVENTOR

BY *M. A. Ellestad*
*B. O. Diggins*
ATTORNEYS

Patented May 18, 1937

2,080,841

UNITED STATES PATENT OFFICE 2,080,841

REFRACTOMETER

Harold W. Straat, Irondequoit, N. Y., assignor to Bausch & Lomb Optical Company, Rochester, N. Y., a corporation of New York Application April 26, 1935, Serial No. 18,398

10 Claims. (Cl. 88—14)

The present invention relates to refractometers and more particularly to a prism system and prism box therefor.

One of the objects of the present invention is to provide a refractometer for measuring the index of refraction of transparent or opaque substances whether liquid or solid. A further object is to provide a new prism system for refractometers. A further object is to provide a prism system for refractometers whereby a substance may be measured by transmitted or reflected light. Another object is to provide a new form of prism box for refractometers. A still further object is to provide a refractometer prism box in which the upper prism has a large area in intimate relation to the fluid chamber. These and other objects and advantages reside in certain novel features of construction, arrangement and combination of parts as will hereinafter be more fully set forth and pointed out in the appended claims.

Figure 1:
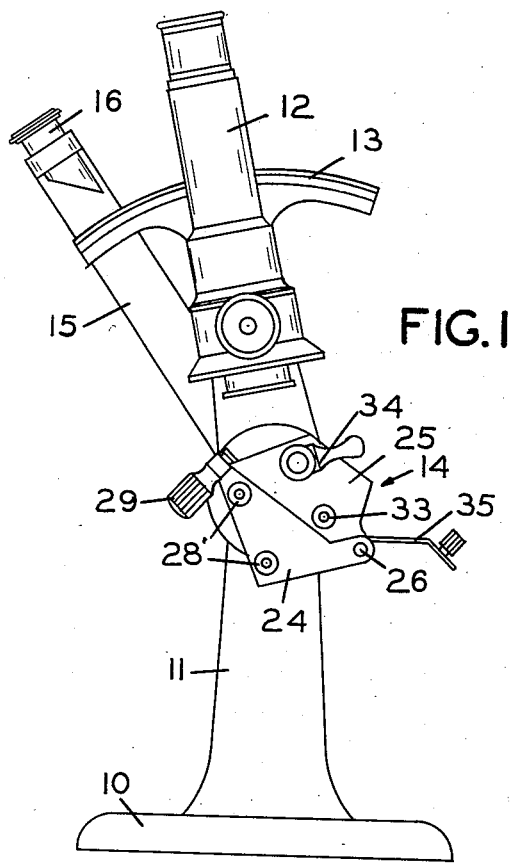
Fig. 1 is a side elevation of a refractometer embodying my invention.

The invention is illustrated in the drawing in connection with an Abbe refractometer in which 10 indicates a base having an upright standard 11. A telescope 12 is pivotally mounted on the standard 11 and the arcuate scale 13 is fixed to the telescope 12. A prism box, indicated generally at 14, is pivoted on the standard 11 for movement about the same axis as the telescope 12, and an alidade 15 is fixed to the prism box 14 and carries a magnifier 16 for reading the scale 13.

The prism system in this type refractometer comprises a lower prism 17 having an entrance surface 18 and a hypotenuse surface 19. As this lower prism 17 is solely for the purpose of illumination its hypotenuse surface 19 is usually finely ground. The upper prism 20 has an exit surface 21 and a hypotenuse surface 22, both of which are polished. In the measuring of the index of refraction of light transmitting fluids, the fluid is placed between the prisms 17 and 20 and light is passed through both prisms. The lower prism 17 is removed when light transmitting solids are to be measured and the light is passed through the solid into the prism.

In the measurement of the index of refraction of opaque substances either fluid or solid, the substance is placed against the hypotenuse surface 22 of the upper prism 20 and light is introduced into the prism 20 and reflected from the hypotenuse surface 22 out through the exit surface 21. The upper prism 20 is provided with a light entrance surface 23 which is substantially normal to the entering light so as to reduce the losses in the light entering the prism 20. It is preferable that the entrance surface 23 and the exit surface 21 make equal angles with the hypotenuse surface 22. The entrance and exit surfaces 23 and 21 may be continued so that the prism 20 will be triangular in cross section but it is preferable that the prism 20 be made trapezoidal in shape as shown. By making the prism 20 trapezoidal the prism has less volume and it is therefore easier to regulate its temperature, and the trapezoidal shape permits the prism to be secured at four points rather than three and thus a more permanent and secure mounting is obtained.

The prism box 14 comprises two housings 24 and 25 pivotally secured at their bottoms by a pin 26. The housing 24, containing the prism 17, has an opening 27 in alignment with the entrance surface 18 of the prism 17. Partially surrounding the prism 17 is a fluid chamber 28 through which fluid is passed to bring the prism 17 to the desired temperature. Inlet and outlet taps 28' are provided to permit the entrance and exit of the fluid. A latch 29 is provided at the top of the housing 24 for locking the prism box 14 in closed position.

The housing 25, containing the upper prism 20 is provided with an opening 30 in alignment with the exit surface 21. In the form shown in Fig. 2, the housing 25 has a wall 31 which is spaced from the prism 20 to form a fluid chamber for the temperature control fluid. A transparent or translucent window 32 is placed in the wall 31 in alignment with the entrance surface 23. As the light entering the entrance surface 23 is merely for illumination, the entrance surface 23 or the window 32, or both, may be finely ground. A fluid inlet tap 33 and outlet tap 34 are provided in the fluid chamber and provision is made in the outlet tap 34 for the insertion of a thermometer.

Figure 2:
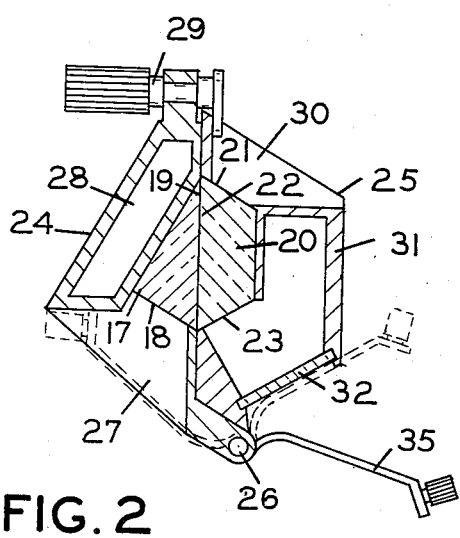
Fig. 2 is a vertical section of the prism box.

Pivotally secured to the pin 26 is an opaque shutter 35 which can be moved to either of the dotted positions shown in Fig. 2 and thus prevent the entry of light through the opening 27 or the window 32. This opaque shutter 35 is preferably formed of polished metal so that it can also serve as a reflector to direct light to either prism.

Figure 3:
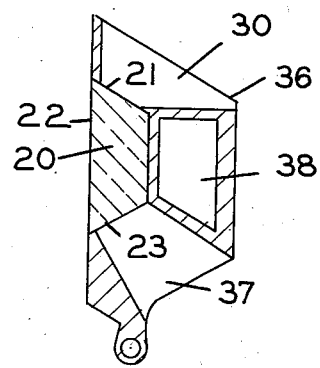
Fig. 3 is a vertical section of a modified form of housing for the upper prism.

Figure 3 shows a housing 36 which can be substituted bodily for the housing 25 shown in Fig. 2. The housing 36 is provided with the opening 30 in alignment with the exit surface 21 of the prism 20 and with a second opening 37 in alignment with the light entrance surface 23. Between the two openings 30 and 37, the housing 36 has a fluid chamber 38 which partially surrounds the prism 20. This form is somewhat cheaper to manufacture but it does not afford the ease of temperature control of the form shown in Fig. 2.

From the foregoing it will be apparent that I am able to attain the objects of my invention and provide a new and improved refractometer which can be used to measure indices of opaque or transparent substances whether fluid or solid. Various modifications can, of course, be made without departing from the spirit of my invention or the scope of the appended claims.

I claim:

1. In a refractometer for examining transparent or opaque substances a lower prism, an upper prism having a hypotenuse surface, an exit surface and an entrance surface, means for directing light through said lower prism, through a transparent substance, through said hypotenuse surface and through said exit surface and means for directing light through said entrance surface, and reflecting it from said hypotenuse surface out through said exit surface.

2. In a refractometer for examining transparent or opaque substances a lower prism, an upper prism having a hypotenuse surface, an exit surface and an entrance surface, means for directing light through said lower prism, through a transparent substance, through said hypotenuse surface and through said exit surface and means for directing light through said entrance surface, and reflecting it from said hypotenuse surface out through said exit surface, said entrance surface of said upper prism being substantially normal to the entering light.

3. In a refractometer for examining transparent or opaque substances a lower prism, an upper prism having a hypotenuse surface, an exit surface and an entrance surface, means for directing light through said lower prism, through a transparent substance, through said hypotenuse surface and through said exit surface and means for directing light through said entrance surface, and reflecting it from said hypotenuse surface out through said exit surface, said entrance surface and said exit surface of said prism making substantially equal angles with said hypotenuse surface.

4. In a refractometer, a prism having a hypotenuse surface, an entrance surface and an exit surface, a housing for said prism, means for securing said prism in said housing with its hypotenuse surface exposed, said housing having an opening in alignment with said exit surface, said housing having a wall spaced from the remaining surfaces of said prism to form a fluid chamber and a fluid-tight, light transmitting window in said wall in alignment with said entrance surface.

5. In a refractometer for measuring transparent or opaque substances a telescope, a prism box comprising two housings, and a prism in each housing, one housing having an opening adjacent the top thereof for permitting the passage of light from said prisms to said telescope, and each housing having an opening adjacent the bottom thereof, one to admit light directly to one prism and the other to admit light directly to the other prism.

6. In a refractometer for measuring transparent or opaque substances, a telescope, a prism box comprising two housings pivotally connected at their bottoms, a prism in each housing, one housing having an opening adjacent the top thereof for permitting the passage of light from said prisms to said telescope, each housing having an opening adjacent the bottom thereof, one to admit light for measuring transparent substances, the other to admit light for measuring opaque substances, and a shutter pivotally carried by said prism box for selectively closing either of said bottom openings.

7. In a refractometer for measuring transparent or opaque substances, a telescope, a prism box comprising two housings pivotally connected at their bottoms, a prism in each housing, one housing having an opening adjacent the top thereof for permitting the passage of light from said prisms to said telescope, each housing having an opening adjacent the bottom thereof, one to admit light for measuring transparent substances, the other to admit light for measuring opaque substances, and a reflecting member adjustably carried by said prism box for directing light selectively to one or the other of said prisms.

8. In a refractometer for examining transparent or opaque substances, a prism system comprising an upper prism having a hypotenuse surface, an exit surface and an entrance surface, and a lower prism having a hypotenuse surface and an entrance surface, means for supporting said prisms with their hypotenuse surfaces facing each other and their entrance surfaces adjacent each other, means for introducing the substance to be examined between said hypotenuse surfaces and means for selectively directing light into one or the other of said entrance surfaces.

9. In a refractometer for examining transparent or opaque substances, a prism system comprising an upper prism having a hypotenuse surface, an entrance surface and an exit surface, said entrance and exit surfaces making substantially equal angles with said hypotenuse surface, and a lower prism having a hypotenuse surface and an entrance surface, means for supporting said prisms with their hypotenuse surfaces facing each other and their entrance faces adjacent each other, means for introducing the substance to be examined between said hypotenuse surfaces and means for selectively directing light through one or the other of said entrance surfaces substantially normal thereto.

10. In a refractometer for measuring transparent or opaque substances, a telescope, a prism housing in alignment with said telescope, a prism in said housing having an entrance surface, an exit surface and a hypotenuse surface, the hypotenuse surface being substantially co-planar with one wall of the housing, said housing having an opening in alignment with said exit surface and said telescope, said housing having a second opening in alignment with said entrance surface, a second prism housing, a second prism in said second housing, said second prism having a hypotenuse surface and an entrance surface, the hypotenuse surface of the second prism being substantially co-planar with one wall of the second housing, said second housing having an opening in alignment with the entrance surface of the second prism and means for supporting both housings with the hypotenuse surfaces of the prisms facing each other.

HAROLD W. STRAAT.